US009745517B2

(12) United States Patent
Levie et al.

(10) Patent No.: US 9,745,517 B2
(45) Date of Patent: Aug. 29, 2017

(54) HIGH PRESSURE FEEDING SYSTEM FOR A LIQUID-BASED BIOMASS TO LIQUID REACTOR

(75) Inventors: Benjamin Levie, Mercer Island, WA (US); Alex Coulthard, Sugarland, TX (US); Daniel Euhus, Corvallis, OR (US); Kent Douglas Robarge, Sumner, WA (US); Paul Spindler, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 739 days.

(21) Appl. No.: 14/233,736

(22) PCT Filed: Jul. 16, 2012

(86) PCT No.: PCT/US2012/046956
§ 371 (c)(1),
(2), (4) Date: Jun. 18, 2014

(87) PCT Pub. No.: WO2013/016055
PCT Pub. Date: Jan. 31, 2013

(65) Prior Publication Data
US 2014/0303415 A1 Oct. 9, 2014

Related U.S. Application Data

(60) Provisional application No. 61/511,952, filed on Jul. 26, 2011.

(51) Int. Cl.
*C10G 1/02* (2006.01)
*C10G 1/00* (2006.01)
*C10G 3/00* (2006.01)
*C11B 1/10* (2006.01)

(52) U.S. Cl.
CPC ............. *C10G 1/002* (2013.01); *C10G 1/00* (2013.01); *C10G 3/00* (2013.01); *C10G 3/40* (2013.01); *C10G 3/50* (2013.01); *C11B 1/10* (2013.01); *C10G 2300/1014* (2013.01); *C10G 2300/4012* (2013.01); *C10G 2300/44* (2013.01); *C10G 2300/805* (2013.01); *Y02P 30/20* (2015.11); *Y10T 137/0318* (2015.04)

(58) Field of Classification Search
CPC ... C10G 3/00; C10G 3/40; C10G 3/50; C10G 1/002; C10G 1/00; C10G 1/02; C07C 1/00; C07C 1/0435; C07C 1/435; C07C 1/0485; C07C 1/485; C07C 1/04; C11B 1/10
USPC ........................................ 585/638, 639, 240
See application file for complete search history.

(56) References Cited

U.S. PATENT DOCUMENTS

| 6,331,320 | B1 | 12/2001 | Nakahara et al. | |
| 7,994,375 | B2 * | 8/2011 | Marker | C10G 1/083 585/240 |
| 8,735,638 | B2 * | 5/2014 | Miller | C07C 9/00 585/240 |
| 2010/0048924 | A1 | 2/2010 | Kilambi | |

OTHER PUBLICATIONS

International Search Report and Written Opinion received for PCT Patent Application No. PCT/US2012/046956, mailed on Sep. 19, 2012, 11 pages.
Fang et al., "Reaction Chemistry and Phase Behavior of Lignin in High-Temperature and Supercritical Water", Bioresouce Technology, vol. 99, 2008, pp. 3424-3430.
Phaiboonsilpa et al., "Two-Step Hydrolysis of Japanese Cedar as Treated by Semi-Flow Hot-Compressed Water", 55th Annual Meeting of the Japan Wood 15 Research Society, Matsumoto, Japan, Mar. 2009, available online at <http://repository.kulib.kyoto-u.ac.jp/dspace/bitstream/2433/128911/1/s10086-009-1099-0.pdf>, 39 pages.
Schacht et al., "From Plant Materials to Ethanol by Means of Supercritical Fluid Technology", The Journal of Supercritical Fluids, vol. 46, 2008, pp. 299-321.
Tan et al., "A Review on Supercritical Fluids (SCF) Technology in Sustainable Biodiesel Production: Potential and Challenges", Renewable and Sustainable Energy Reviews, vol. 15, 2011, pp. 2452-2456.
Veski et al., "Co-Liquefaction of Kukersite Oil Shale and Pine Wood in Supercritical Water", Oil Shale, vol. 23, No. 3, 2006, pp. 236-248.
Wen et al., "Supercritical Fluids Technology for Clean Biofuel Production", Progress in Natural Science, vol. 19, 2009, pp. 273-284.

* cited by examiner

*Primary Examiner* — Sharon Pregler
(74) *Attorney, Agent, or Firm* — Howard V. Owens

(57) ABSTRACT

The present disclosure provides methods to transfer a pressurized slurry of plant-based biomass into a reactor vessel. The methods allow for the transfer of practical-sized pieces of biomass in a slurry pressurized to above about 300 psi.

35 Claims, 3 Drawing Sheets

HIGH PRESSURE FEEDING SYSTEM FOR A LIQUID-BASED BIOMASS TO LIQUID REACTOR

CROSS-REFERENCE TO RELATED APPLICATIONS

This application is a National Phase application under 35 U.S.C. §371 of International Application No. PCT/US2012/046956, filed Jul. 16, 2012, which claims the benefit of U.S. Provisional Patent Application Ser. No. 61/511,952, filed Jul. 26, 2011, which are incorporated herein by reference in their entireties.

BACKGROUND

1. Field

The present disclosure relates generally to a method for transferring biomass into a reactor vessel to produce a liquefied fuel product. In particular, the present disclosure relates to a method for transferring a pressurized slurry of biomass into a high pressure, high temperature reactor vessel to produce a bio-oil product that can be converted into biofuels.

2. Related Art

Biomass offers a potentially renewable source for fuel, supplementing or replacing petroleum, coal and natural gas. Biomass typically comprises large amounts of cellulose, often bound together by lignin. Cellulose and lignin can be converted into biofuels via thermochemical conversion processes.

Many processes are known for converting a slurry of biomass and liquid into liquid fuels. These processes may include hydrothermal pyrolysis followed by hydroprocessing, supercritical gasification or liquefaction followed by Fischer-Tropsch or other synthesis, high temperature hydrolysis catalyzed with an acid or base followed by fermentation or catalytic reforming, and solvent liquefaction followed by hydroprocessing.

Of these processes, solvent liquefaction is performed at moderate pressure and temperature. For example, early efforts involved hydrogenation with hydrogen gas at high temperatures to convert lignin-containing biomass into a liquid fuel. More recent efforts involve solvent liquefaction processes, typically conducted at high temperatures (e.g., at least 200° C.) and high pressures (e.g., at least 200 psi). The solvent liquefaction process typically employs a hydrogen donor solvent to reduce the oxygen content of the biomass, which in turn increases the energy content of the biomass for use as combustible fuels. Liquefaction produces a liquid product that usually still has an oxygen content that is above the specifications needed for refinery blendstocks. Accordingly, the liquid product will generally undergo an additional step of hydroprocessing for conversion into useful refinery blendstock products.

Biomass is typically harvested and delivered in varying sizes. For many of these known processes performed at high pressures and/or high temperatures, the physical size of the biomass needs to first be reduced. Methods known in the art to reduce biomass size include chipping, grinding, shredding, chopping, and milling.

Reducing biomass size helps improve mass transfer or chemical reaction kinetic (reaction) rates, but requires capital equipment and energy inputs that can exceed the benefit. Generally, the biomass size specification is a compromise that is optimized when the incremental cost of more size reduction is equal to the incremental benefit of faster reactions resulting. However, in the case of high pressure reactions, the feeding system often dictates the size reduction required.

Currently, feeding more practical-sized pieces of biomass into a high pressure, high temperature reactor vessel at commercial scale is expensive and energy inefficient using conventional equipment. Plug screw devices, high pressure rotating feeders, and rotating star type feeders may be used to feed slurries of biomass and liquid into reactor vessels; however, the limit in the feeding device in industrial/commercial use is about 150-200 psi due to mechanical seal limits. Other types of equipment such as extruders may be used, but these have not been used with biomass at high throughputs, have relatively high capital costs, and have relatively high electricity demands. While lock hopper designs are technically feasible, they do not support continuous operation, which confers a commercial advantage for scaling up reactions compared to batch operations. Moreover, lock hopper designs present significant problems with respect to keeping the seals clean and free of reaction materials. Reciprocating pumps may also be used, but require materials with very fine particle size, making this type of equipment commercially unattractive to convert biomass into liquid fuels.

What is needed in the art is a commercially viable method that is energy efficient, reliable, and continuous for feeding practical-sized biomass into a high pressure, high temperature reactor. What is also needed is a commercially viable method that can vary the ratio of biomass to liquid that enters the reactor. In particular, a method to feed a pressurized slurry of biomass into a high pressure, high temperature reactor vessel, without needing to grind the biomass is desired. Once the pressurized slurry of biomass is fed into the reactor vessel, the biomass can be converted into a gas, liquid fuel, and/or a bio-oil product that may be used to produce fuels or chemicals.

SUMMARY

The present disclosure addresses this need by providing methods for transferring a pressurized slurry of biomass into a high pressure, elevated temperature reactor vessel. The methods disclosed herein make it possible to produce a bio-oil product from practical-sized pieces of cellulosic or lignocellulosic biomass.

In one exemplary embodiment, a slurry of plant-based biomass is transferred into a reactor vessel by providing plant-based biomass, wherein the biomass is made up of discrete pieces, wherein at least 20% of the discrete pieces have a greatest dimension of at least about ⅛ inch; combining a transport fluid with the biomass to form a pre-reaction slurry, wherein the pre-reaction slurry has a first weight ratio of fluid to biomass; pressurizing the pre-reaction slurry to a pressure above about 300 psi; removing at least a portion of the transport fluid from the pressurized pre-reaction slurry in a pre-reactor vessel to form a pressurized concentrated slurry with a second weight ratio of fluid to biomass, wherein the first weight ratio of fluid to biomass is greater than the second weight ratio of fluid to biomass; combining a reaction fluid from a reactor vessel with the pressurized concentrated slurry to form a pressurized reaction slurry; and transferring the pressurized reaction slurry from the pre-reactor vessel into the reactor vessel, wherein the pressurized reaction slurry is received at the reactor vessel at a pressure above about 300 psi.

In another exemplary embodiment, a slurry of plant-based biomass is transferred into a reactor vessel by providing plant-based biomass, wherein the biomass is made up of discrete pieces, wherein at least 20% of the discrete pieces have a greatest dimension of at least about ⅛ inch; combining a transport fluid with the biomass to form a pre-reaction slurry, wherein the pre-reaction slurry has a first weight ratio of fluid to biomass; pressurizing the pre-reaction slurry to a pressure above about 300 psi; removing at least a portion of the transport fluid from the pressurized pre-reaction slurry to form a pressurized concentrated slurry with a second weight ratio of fluid to biomass, wherein the first weight ratio is greater than the second weight ratio; combining a reaction fluid with the pressurized concentrated slurry to form a pressurized reaction slurry; and transferring the pressurized reaction slurry into a reactor vessel, wherein the reaction slurry is received at the reactor vessel at a pressure above about 300 psi.

BRIEF DESCRIPTION OF THE DRAWINGS

The present application can be understood by reference to the following description taken in conjunction with the accompanying figures, in which like parts may be referred to by like numerals.

DETAILED DESCRIPTION

The following description sets forth numerous exemplary configurations, processes, parameters, and the like. It should be recognized, however, that such description is not intended as a limitation on the scope of the present invention, but is instead provided as a description of exemplary embodiments.

The following description relates to a method for transferring a pressurized slurry of biomass into a high pressure, high temperature reactor vessel. This method can handle pieces of biomass that have not been physically pre-treated (e.g., by grinding or pulping), and the slurry fed into the reactor vessel has a pressure above at least 300 psi.

Figure 1:
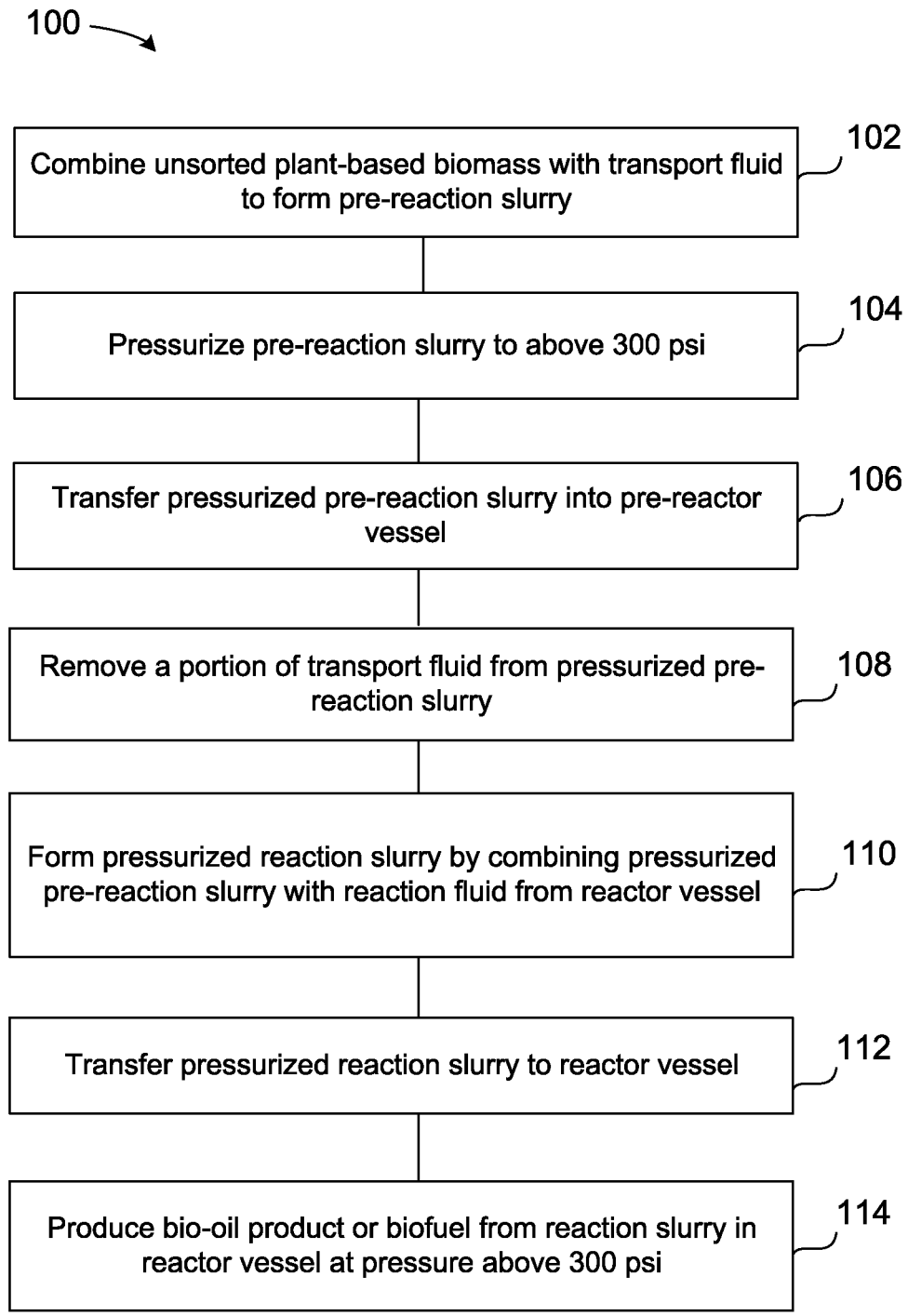
FIG. 1 depicts an exemplary process for transferring a pressurized slurry of biomass into a high pressure, high temperature reactor vessel.

With reference to FIG. 1, process 100 is an exemplary embodiment that depicts transferring biomass having practical sizes into a reactor vessel, where the biomass is converted into a bio-oil product that can be used to produce biofuels. In step 102, unsorted wood chips are combined with a large volume of hydrocarbon-rich transport fluid to form a pre-reaction slurry. This pre-reaction slurry has a high fluid-to-biomass ratio, with significantly more fluid compared to biomass, to allow the slurry to pass through pressurizing pumps, as depicted in step 104. In this step, pumps pressurize this pre-reaction slurry to a high pressure, corresponding to the pressure inside the reactor vessel. In step 106, this pressurized pre-reaction slurry is then transferred to a pre-reactor vessel. In step 108, some of the transport fluid is removed from the pressurized pre-reaction slurry, lowering the fluid-to-biomass ratio of this pressurized pre-reaction slurry.

Step 108 contributes to the efficiency of the system by providing a thermal break. Since a high fluid-to-biomass ratio is needed to carry the relatively large wood chips through the pressurizing pumps, a significant amount of energy would be needed to heat this slurry to the high temperature required in the reactor vessel. By removing some of the transport fluid from the pre-reaction slurry, less energy is required to heat the slurry transferred to the reactor vessel.

In order to increase the temperature of the pressurized pre-reaction slurry to the high reaction temperature inside the reactor vessel, in step 110, the pressurized concentrated slurry inside the pre-reactor vessel is combined with a reaction fluid from the reactor vessel, heated to a high reaction temperature, to form the pressurized reaction slurry. In step 112, the pressurized reaction slurry is transferred to the reactor vessel. In step 114, the reaction slurry undergoes a high pressure, high temperature reaction to produce a bio-oil product.

It should be noted, however, that one or more steps may be omitted or added from process 100. For example, in other embodiments of the process described herein, step 106 involving the transfer of the pressurized pre-reaction slurry into a pre-reactor vessel may be omitted. The pressurized pre-reaction slurry may be transferred directly to a reactor vessel. In other embodiments of the process described herein, additional steps may include adding piping to adjust the liquid-to-biomass ratio of the slurry being transferred.

As used herein, the term "about" refers to an approximation of a stated value within an acceptable range. Preferably, the range is +/−10% of the stated value.

The Plant-Based Biomass a) Type

The biomass used in step 102 can be any plant-based material. The biomass is typically made up of organic compounds that are relatively high in oxygen, such as carbohydrates, and may also contain a wide variety of other organic compounds. In one embodiment, the plant-based biomass is made up of lignin and/or cellulose. The plant-based biomass may contain at least about 10% lignin on a dry-weight basis. Optionally, the plant-based biomass may contain hemicelluloses, plant-derived oils (e.g., terpenes), and the like.

One skilled in the art would recognize the different types of plant-based biomass available. For example, wood or wood byproducts may be used, as well as sources such as switchgrass, wheatstraw, corn stover, energy or sugar bagasse, and the like. Wood residues may be used, either alone or in combination with other biomass materials. Woody materials tend to be high in lignin content. Grassy materials such as switchgrass, lawn clippings or hay may be used, either alone or in combination with other biomass materials. Grassy materials tend to contain large amounts of cellulose and lower lignin ratios. Partially processed materials such as solid residues from wood pulp production may also be used. It should also be recognized that a mixture of different types of biomass described herein may be used.

b) Size

The biomass used in step 102 is made up of discrete pieces. The biomass is typically made up of discrete pieces having irregular shapes, but the biomass used herein may also be of regular shapes.

Existing methods for transferring a pressurized slurry of fibrous biomass into a high pressure reactor vessel currently require comminution of biomass by mechanical methods to provide finer particles. The presence of even a few pieces of relatively large biomass pieces in the feedstock can present problems for transfer in these existing methods known in the art. The methods described herein address this limitation.

The methods described herein allow for transferring a pressurized slurry containing practical-sized pieces of biomass into a reactor vessel. In one embodiment, at least 20% of the discrete pieces of biomass have a greatest dimension of at least about ⅛ inch. In yet another embodiment, at least 50% of the discrete pieces of biomass have a greatest dimension of at least about ⅛ inch. In yet another embodiment, at least 75% of the discrete pieces of biomass have a greatest dimension of at least about ⅛ inch. In yet another embodiment, at least 90% of the discrete pieces of biomass have a greatest dimension of at least about ⅛ inch.

In another embodiment, at least 20% of the discrete pieces of biomass have a greatest dimension of at least about ⅜ inch. In yet another embodiment, at least 50% of the discrete pieces of biomass have a greatest dimension of at least about ⅜ inch. In yet another embodiment, at least 75% of the discrete pieces of biomass have a greatest dimension of at least about ⅜ inch. In yet another embodiment, at least 90% of the discrete pieces of biomass have a greatest dimension of at least about ⅜ inch.

In another embodiment, at least 20% of the discrete pieces of biomass have a greatest dimension of at least about 1 inch. In yet another embodiment, at least 50% of the discrete pieces of biomass have a greatest dimension of at least about 1 inch. In yet another embodiment, at least 75% of the discrete pieces of biomass have a greatest dimension of at least about 1 inch. In yet another embodiment, at least 90% of the discrete pieces of biomass have a greatest dimension of at least about 1 inch.

It should be recognized, however, that some of the discrete pieces of the biomass used in the methods described herein may still be comminuted into smaller pieces by chipping, grinding, shredding, chopping, and milling.

The Transport Fluid a) Type

The transport fluid used in step 102 can be any type of fluid used to form a slurry of biomass that can be pumped and transported through the system. Typically, the transport fluid is selected based on its attributes for converting the biomass under processing conditions. Suitable transport fluids include, for example, water, polar solvents, nonpolar solvents, other hydrocarbons, and recycled fluids derived from the conversion of the biomass slurry. Fluids that will be supercritical at reactor conditions may also be used in some applications.

In some embodiments, the transport fluid may include water, a light cycle oil, a recycled bio-oil, a dilute acid, a dilute base, or any combination thereof. In one embodiment, the transport fluid is water. In another embodiment, the transport fluid is a light cycle oil, a recycled bio-oil, or a combination thereof. In one embodiment, the light cycle oil is light catalytically cracked distillate. In another embodiment, the recycled bio-oil is a product from solvent liquefaction of biomass. In some embodiments, the transport fluid is a dilute acid or a dilute base. In one embodiment, the dilute acid is sulfuric acid or acetic acid. In another embodiment, the dilute base is sodium hydroxide or ammonia. In yet another embodiment, the transport fluid is a supercritical fluid under the reaction conditions.

b) Storage

The transport fluid is held in a surge tank that feeds the pumps pressurizing the slurry. The maximum temperature of the transport fluid stored in the surge tank may depend on the maximum temperature that can be handled by the pressurizing pumps. For example, if the pumps can only handle a maximum temperature of 100° C., the transport fluid stored in the surge tank that combines with the biomass will have a maximum temperature of 100° C.

The Pre-Reaction Slurry

As depicted in step 102, the pre-reaction slurry is formed when biomass combines with transport fluid. This pre-reaction slurry has a first weight ratio of fluid to biomass. The "fluid-to-biomass" ratio is a unit of measure that indicates the relative amount of solids in a slurry containing both solids and liquids. As described herein, this fluid-to-biomass ratio is the ratio of the weight of the transport fluid being transferred to the weight of the biomass material being transferred. It should be recognized, however, that the fluid-to-biomass ratio of the biomass used in the methods described herein may also be expressed as a volume ratio of fluid-to-biomass, i.e., the volume of the transport fluid being transferred to the volume of the biomass material being transferred.

One skilled in the art would recognize that the fluid-to-mass biomass ratio of the slurry transferred into a high pressure, high temperature reactor vessel affects the overall efficiency of the system. A slurry with a high fluid-to-biomass ratio is needed to pass the slurry through the pressurizing pumps to avoid clogging the pumps. A slurry with a high fluid-to-biomass ratio, however, requires more energy per unit of biomass input to heat to the high reaction temperature, compared to a slurry with a lower fluid-to-biomass ratio.

As such, step 104 employs a slurry with a high fluid-to-biomass ratio when transferred through the pumps to pressurize the slurry. In one embodiment, the weight ratio of fluid-to-biomass of the pre-reaction slurry (i.e., first weight ratio) is at least 8 parts fluid to 1 part biomass. In another embodiment, the weight ratio of fluid-to-biomass of the pre-reaction slurry is at least 7 parts fluid to 1 part biomass. In yet another embodiment, the weight ratio of fluid-to-biomass of the pre-reaction slurry is at least 6 parts fluid to 1 part biomass. In yet another embodiment, the weight ratio of fluid-to-biomass of the pre-reaction slurry is at least 6.5 parts fluid to 1 part biomass. In yet another embodiment, the weight ratio of fluid-to-biomass of the pre-reaction slurry is at least 6 parts fluid to 1 part biomass. In yet another embodiment, the weight ratio of fluid-to-biomass of the pre-reaction slurry is at least 5.5 parts fluid to 1 part biomass.

To increase the overall efficiency of process 100, the fluid-to-biomass ratio is reduced in step 108, once the slurry is pressurized. This pressurized concentrated slurry may be heated to the high reaction temperature in a more energy-efficient way. In one embodiment, the weight ratio of fluid-to-biomass of the pressurized concentrated slurry (i.e., second weight ratio) is between about 1.5-5 parts fluid to 1 part biomass. In yet another embodiment, the weight ratio of fluid-to-biomass of the pressurized concentrated slurry is less than 5 parts fluid to 1 part biomass. In yet another embodiment, the weight ratio of fluid-to-biomass of the pressurized concentrated slurry is less than 4 parts fluid to 1 part biomass. In yet another embodiment, the weight ratio of fluid-to-biomass of the pressurized concentrated slurry is less than 3 parts fluid to 1 part biomass. In yet another embodiment, the weight ratio of fluid-to-biomass of the pressurized concentrated slurry is less than 2.5 parts fluid to 1 part biomass. In yet another embodiment, the weight ratio of fluid-to-biomass of the pressurized concentrated slurry is less than 2 parts fluid to 1 part biomass.

The removed fluid can be recycled in process 100, and return to the surge tank. In some embodiments, the removed fluid has a high temperature and a high pressure. In some embodiments, the removed fluid has a temperature between about 100-200° C., and a pressure of about 600 psi. Before re-entry into the surge tank, heat is removed via a heat exchanger and pressure reduced via a pressure-reducing valve. The fluid is returned to the surge tank at atmospheric pressure. In some embodiments, the fluid returned to the surge tank has a temperature of about 100° C.

The Pressurizing Pumps

Any pumps known in the art to move a slurry of materials may be used in step 104. In some embodiments, open impeller pumps are used. Other suitable pressurizing pumps include, for example, progressing cavity, lobe, sinusoidal rotor, flexible impeller, and flexible tube (peristaltic) pumps.

Any number and arrangement of pumps may be used in step 104. The number and arrangement of pumps depends on the pressure inside the reactor vessel that needs to be reached. For example, if open impeller pumps are used, one skilled in the art would recognize that each open impeller pump increases the pressure of the slurry by about 50-100 psi. As the pressurized slurry passes through each succeeding pump or pump stage to the next in the series, the pressure of the slurry incrementally increases. As such, the number of open impeller pumps employed in the methods described herein depends on the reaction pressure selected. By way of example, if the final pressure inside the reactor vessel is about 300 psi, the slurry will be pressurized to about 300 psi using 3-6 open impeller pumps arranged in a series. On the other hand, if progressing cavity pumps or peristaltic pumps are used, one pump may can be used to achieve the desired high pressure (e.g. about 3200 psi).

In some embodiments, the pre-reaction slurry may be pressurized to a pressure between 300 psi and about 4000 psi. In other embodiments, the pre-reaction slurry may be pressurized to a pressure between 300 psi and about 3200 psi. In other embodiments, the pre-reaction slurry may be pressurized to a pressure between 300 psi and about 1500 psi. In other embodiments, the pre-reaction slurry is pressurized to a pressure between 1500 psi and about 3200 psi. In other embodiments, the pre-reaction slurry is pressurized to a pressure between 300 psi and about 700 psi. In another embodiment, the pre-reaction slurry may be pressurized to a pressure between 300 psi and about 600 psi. In yet another embodiment, the pre-reaction slurry may be pressurized to a pressure between 450 psi and about 600 psi.

Once the pre-reaction slurry is pressurized, the slurry remains pressurized throughout the remaining steps in process 100. It should be understood, however, that there may be pressure drops related to the movement of the slurry to the reactor. In some embodiments, the reaction slurry is received at the reactor vessel at a pressure between 300 psi and 1600 psi. In other embodiments, the reaction slurry is received at the reactor vessel at a pressure between 300 psi and 700 psi. In yet other embodiments, the reaction slurry is received at a pressure between 400 psi and 600 psi.

The Pre-Reactor Vessel

The pre-reactor vessel in step 106 can handle at least the same pressures, if not higher pressures, than the reactor vessel. In some embodiments, a vertical plug flow vessel is used. Other suitable configurations would transport the slurry from the input to the output of the pre-reactor, and would also keep separate the temperature of the incoming fluid from the higher exit temperature.

The pre-reactor vessel confers several advantages to the methods described herein. One such advantage is that the pre-reactor vessel provides a thermal break for the system, which increases the thermal energy efficiency of the system. As discussed above, by allowing a portion of the transport fluid to return to the surge tank at a lower temperature compared to the reaction temperature, less energy is used overall to heat the slurry of wood chips to the reaction temperature.

The pressurized pre-reaction slurry inside the pre-reactor vessel may have a temperature between about 100° C. and 200° C. The pressurized pre-reaction slurry inside the pre-reactor vessel may have a pressure between 300 psi and about 700 psi. In another embodiment, the pressurized pre-reaction slurry inside the pre-reactor vessel may have a pressure between 300 psi and about 600 psi. In yet another embodiment, the pressurized pre-reaction slurry inside the pre-reactor vessel may have a pressure between 450 psi and about 600 psi.

In some embodiments, however, the process described herein does not include a pre-reactor vessel. Rather, a separator may be employed to remove excess liquid from the pressurized slurry while the slurry is relatively cold, and a higher temperature reaction fluid can then be added to the pressurized concentrated slurry prior to transfer into the reactor vessel. Excess liquid is removed by gravity and/or pressure difference. The separator may also be tilted to increase liquid removal. One skilled in the art would recognize suitable configurations for the separator that may be employed. For example, the separator may be a tube with a side opening that contains a screen. The separator could also be an entire screen within the tube that creates an annular region between the screen and the tube. The separator may also be configured to avoid plugging of the screen. The use of a separator provides a thermal break for the system, which increases the thermal energy efficiency of the system.

The Reactor Vessel

The reactor vessel in step 114 can be any reactor vessel suitable for a process that can convert plant-based biomass into a bio-oil product may be employed in the methods described herein. In some embodiments, a vertical downflow moving bed tubular reactor is used. Other suitable types of reactor types may include, for example, upflow moving bed, continuous stirred reactor, and ebulliated bed reactors.

The reactor vessel includes at least a reaction container suitable for the pressures and temperatures described herein. It should be understood that the pressure and temperature may depend on the type of reaction inside the vessel. Typically, the reactor vessel will be suited to operating pressures between about 200 psi and 4000 psi, and to operating temperatures up to about 400° C. to 600° C. In some embodiments, the reactor vessel is suited to operating pressures between 300 psi and 1500 psi, and to operating temperatures up to about 450° C. to 500° C. In other embodiments, the reactor vessel is suited to operating pressures between 300 psi and 800 psi, and to operating temperatures up to about 420° C.

Additionally, the reactor vessel may optionally include inlets on or into the reaction container to permit addition of reaction fluid (e.g., solvents) into the reaction container, and at least one outlet for removing product from the reaction container. A solvent delivery subsystem is also optionally included. A heating subsystem is also included. One skilled in the art would recognize that the reactor vessel may be heated by any method known in the art. For example, heating subsystem may comprise a recirculation loop and/or a heat exchanger.

The reactor vessel may be configured for flow-through operation to allow gaseous products and steam to vent by top removal, and the liquids and solids (slurry) from the reaction process flow downward. Distillation columns can be used to continuously separate reactor product into desired fractions, including one fraction of suitable boiling range for use as a recycle stream when desired.

Optionally, the reactor vessel can also include a filtration or other physical separation subsystem to remove insoluble materials from the crude reaction product, and a thermal or chemical separation subsystem capable of separating a portion of the filtered material to provide a recycle stream comprising a fraction of the bio-oil product.

Waste handling subsystems can also be provided to remove waste solids or gases from the reaction. The reactor vessel can optionally further include a subsystem to capture the bio-oil effluent. Optionally, too, the system can include an outlet for collecting gases produced in the reaction process. These gases and/or solids removed from the crude product by filtration, or any left as unconverted biomass, can be captured and used (e.g., burned) to provide heat for the reaction process. Further processing subsystems, such as a hydroprocessing system or additional extraction, distillation, adsorption, or filtration systems can also be included.

The Reaction Slurry

As depicted in step 110, a pressurized reaction slurry is formed when the pressurized pre-reaction slurry is combined with a reaction fluid from the reactor vessel. The reaction slurry inside the reactor vessel may have a temperature between about 400° C. to 600° C. In other embodiments, the reaction slurry inside the reactor vessel may have a temperature between about 450° C. to 500° C. In yet other embodiments, the reaction slurry inside the reactor vessel may have a temperature between about 420° C.

The reaction slurry inside the reactor vessel may have a pressure between about 200 psi and 4000 psi. In other embodiments, the reaction slurry inside the reactor vessel may have a pressure between 300 psi and about 3200 psi. In yet other embodiments, the reaction slurry inside the reactor vessel may have a pressure between 300 psi and about 1500 psi. In yet other embodiments, the reaction slurry inside the reactor vessel may have a pressure between 300 psi and about 700 psi. In yet other embodiments, the reaction slurry inside the reactor vessel may have a pressure between 450 psi and about 600 psi.

The Reaction Inside the Reactor Vessel

The reaction taking place inside the reactor vessel in step 114 may include any reactions suitable for converting biomass into a bio-oil product or biofuel. As discussed above, this may include for example hydropyrolysis followed by hydroprocessing, gasification followed by Fischer-Tropsch synthesis, hydrolysis followed by fermentation, and solvent liquefaction followed by hydroprocessing.

Process 100 is particularly well-suited to high pressure, high temperature reactions, such as liquefaction. Other suitable reactions inside the reactor vessel may include, for example, hydrothermal pyrolysis, supercritical gasification or liquefaction, and high temperature hydrolysis. One skilled in the art would recognize the suitable conditions (e.g., temperature, pressure, solvent system) used for these different types of reactions.

In some embodiments, liquefaction is taking place inside the reactor vessel at a pressure of at least 300 psi, and a temperature of at least 250° C. In other embodiments, the pressure inside the reactor vessel is between about 200 psi and 1500 psi, and the temperature is between about 300° C. to 500° C. In yet other embodiments, the pressure inside the reactor vessel is between 300 psi and 800 psi, and the temperature is up to between 400° C. to 450° C. In some embodiments, supercritical water gasification is taking place inside the reactor vessel at a pressure of at least 3200 psi. In other embodiments, supercritical fluid liquefaction is taking place inside the reactor vessel at pressures of between 200 and 4000 psi. In other embodiments, hydrolysis is taking place inside the reactor vessel at a pressure of between 200 to 400 psi.

The reaction fluid used in step 110 to form the reaction slurry and in step 114 to produce the bio-oil product or biofuel can be any solvent or solvent mixture that provides suitable solubilization of components of the biomass to promote the reaction inside the reactor vessel and helps minimize side reactions. Depending on the reaction inside the vessel, suitable reaction fluids may include, for example, water (including supercritical water), a dilute acid, or a dilute base. In certain embodiments, the fluid is the same as the transport fluid.

In certain embodiments where the reaction inside the reactor vessel is liquefaction, the reaction fluid can be any solvent or solvent mixture that provides suitable solubilization of components of the biomass to promote liquefaction and helps minimize side reactions. Typically, it is desired that the reaction fluid also provides miscibility of the bio-oil product with hydrocarbon or petroleum refinery streams, permitting the product to be co-processed in a petroleum refinery.

For liquefaction, the reaction fluid may be a solvent or solvent mixture that typically includes a hydrogen donor solvent. Hydrogen donor solvents can delivery hydrogen to reduce the oxidation level and oxygen content of the biomass materials. Reducing the oxidation level increases the energy density of the product, making it more suitable for use as a fuel by combustion or other similar methods.

The reaction fluid used in process 100 typically has an elevated temperature. Any methods known in the art may be used to increase the reaction fluid temperature. For example, a heat exchanger may be used. In some embodiments, the reaction fluid has a temperature between 250° C. to 800° C. In other embodiments, the reaction fluid has a temperature between 400° C. to 600° C. In yet other embodiments, the reaction fluid has a temperature between 450° C. to 500° C. In certain embodiments, the reaction fluid has a temperature of about 420° C.

Example 1

Production of Bio-Oil from Wood Chips in a Two-Vessel System

Figure 2:
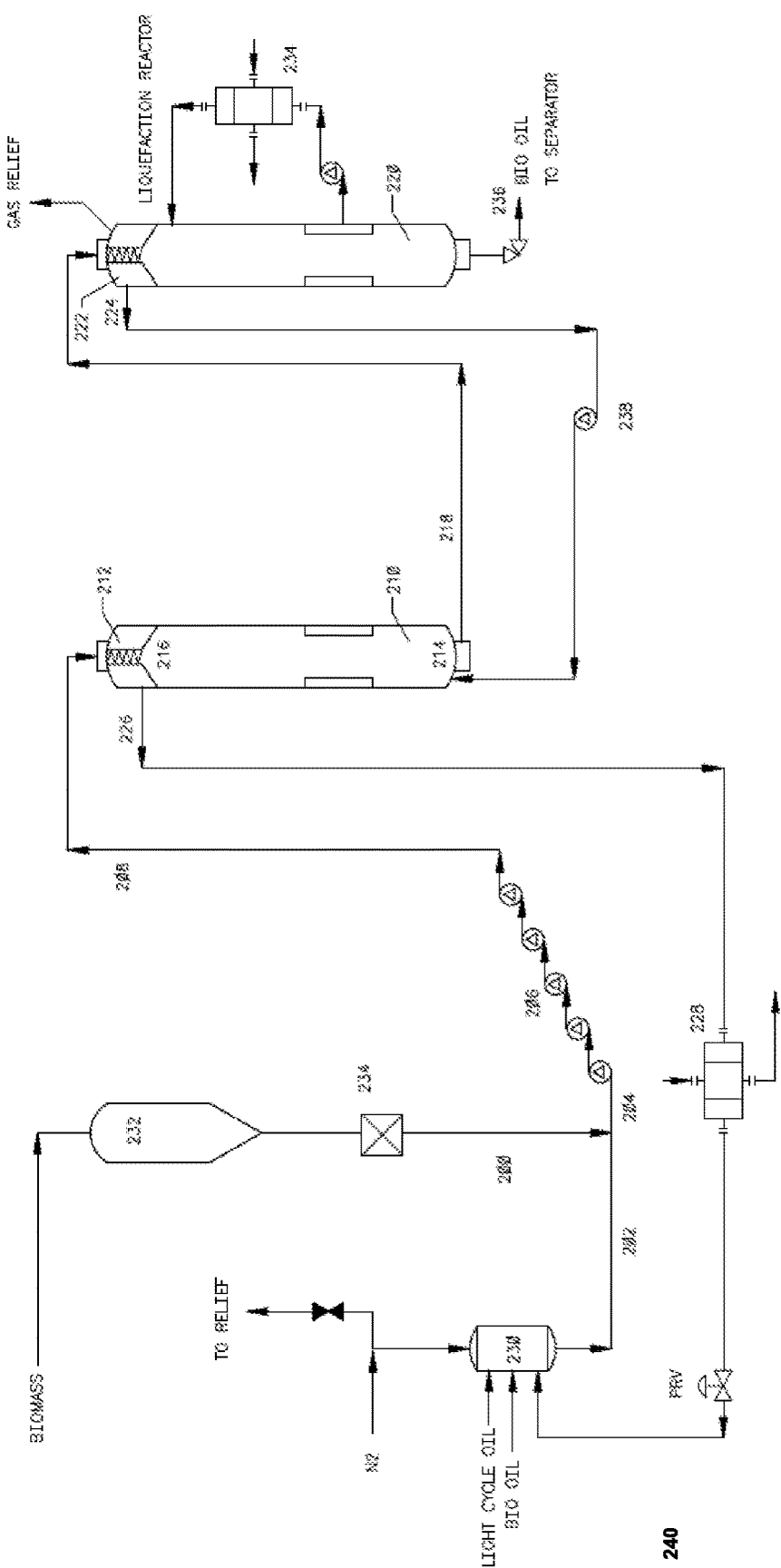
FIG. 2 depicts a two-reactor system for transferring a pressurized slurry of practical-sized pieces of woody biomass into a high pressure, high temperature reactor vessel, in which a solvent liquefaction converts the biomass into a bio-oil product.

Wood chips are converted into bio-oil in a specific implementation of the process depicted in FIG. 1. The components of a two-vessel system for transferring a slurry of wood chips into a high pressure, high temperature reactor vessel are depicted in FIG. 2.

Forming a Pre-Reaction Slurry

First, practical-sized pieces of plant-based biomass are combined with a transport fluid to form a pre-reaction slurry. With reference to FIG. 2, wood chips 200 are fed into the system at about 100 metric tons/hour. At the same time, transport fluid 202 is also is fed into the system at about 800 metric tons/hr. Transport fluid 202 is a mixture of light cycle oil and bio-oil. The wood chip stream and transport fluid stream combine to form pre-reaction slurry 204. This pre-reaction slurry has about 8 parts fluid to 1 part biomass by weight. This 8-to-1 ratio allows the pre-reaction slurry to flow through open impeller pumps 206 without clogging the pumps.

Wood chips 200 have a moisture content of about 12-20%. Wood chips 200 are pieces having different sizes and irregular shapes. Some pieces of wood chips may be as large as 6 inches wide in any given dimension, but most of the pieces are about 1-4 inches wide. About 20% or more of the wood chip pieces in chip bin 232 are at least ⅛ inch wide. Chip pump 234 regulates the flow of wood chips 200 leaving the bin, as they combine with light cycle oil 202 to form a slurry.

The light cycle oil in the transport fluid is a highly aromatic refinery stream that carries the wood chips through the pumps pressurizing and into the pre-reactor vessel. Transport fluid 202 is stored in surge tank 230 at around 90-100° C., and typically does not exceed a maximum temperature of about 100° C. When combined with wood chips 200 to form pre-reaction slurry 204, transport fluid 202 has a temperature of about 90-100° C.

Pressurizing and Transferring the Pre-Reaction Slurry

After forming the pre-reaction slurry, the pre-reaction slurry is pressurized to a high pressure. With reference to FIG. 2, pre-reaction slurry 204 flows at about 100 metric tons biomass and 800 tons fluid/hr through a series of five open impeller pumps 206 which pressurize the slurry to about 600 psi. The pressurized slurry of wood chips is transferred to pre-reactor vessel 210, an intermediate vessel (i.e., the pre-reactor vessel) before transfer into reactor vessel 220.

While the pre-reaction slurry is pressurized to about 600 psi in FIG. 2, the slurry may be pressurized to any pressure above about 300 psi. The pressure chosen may depend on the pressure required for the liquefaction process taking place inside the reactor vessel. The pressure selected is one that promotes liquefaction of at least part of the biomass. The pressure that promotes liquefaction may in turn depend on the solvent system of the liquefaction process.

Transferring the Pressurized Pre-Reaction Slurry to a Reactor Vessel

Some of the transport fluid is removed from the slurry to form a pressurized concentrated slurry in the pre-reactor vessel. With reference to FIG. 2, pre-reactor vessel 210 is an impregnation vessel with top separator 212 and sluicing section 214 at the bottom. Some of the transport fluid from pre-reaction slurry 208 is removed in top separator 212, leaving pressurized slurry 216 inside the pre-reactor vessel with about 2 parts fluid to 1 part biomass by weight. Slurry 216 has a lower fluid-to-biomass ratio compared to slurry 208 to reduce the volume of liquid flowing into the pre-reactor vessel. This lower ratio of fluid-to-mass of the pressurized concentrated slurry provides a thermal break for the system, and enables recycling of a portion of the transport fluid. Liquid 226 is recycled by returning to surge tank 230. Liquid 226 leaving pre-reactor vessel 210 has a temperature between about 100-200° C., and a pressure of about 600 psi. Before re-entry into surge tank 230, heat exchanger 228 reduces the temperature of liquid 226, while pressure reducing value 240 relieves the pressure of liquid 226. Liquid 226 is returned to surge tank 230 at atmospheric pressure and has a maximum temperature of about 100° C.

While liquid 226 in FIG. 2 is returned to the surge tank at a maximum temperature of about 100° C., the maximum temperature of the transport fluid in the surge tank may vary, depending on the maximum temperature that can be handled by the pumps used to pressurize the pre-reaction slurry. It should be recognized that the transport fluid does not necessarily need to be recycled in the methods described herein. In some embodiments, a separate system can be used to provide a constant supply of transport fluid to the surge tank. The recycling of the transport fluid, however, makes the methods described herein more cost-effective.

In the meanwhile, sluicing section 214 at the bottom of pre-reactor 210 receives a steady flow of liquefaction fluid 224 at a rate of 200 metric tons/hour from top separator 222 of reactor vessel 220. Closed impeller pump 238 draws a steady flow of the liquefaction fluid from the reactor vessel into the pre-reactor vessel. While a closed impeller centrifugal pump is used in this Example, it should be recognized that the reaction fluid can be transferred using any type, number and arrangement of pumps known in the art to move fluids at the pressures and flows required, including for example rotary type, screw pumps, gear pumps, open impeller centrifugal pumps, and eductor-jet pumps.

Liquefaction fluid 224 flowing from the reactor vessel into the pre-reactor vessel has a temperature of about 380° C. Heat exchanger 234 heats the liquefaction fluid inside reactor vessel 220. It should be recognized, however, that the temperature of the reaction fluid received by the pre-reactor vessel depends on the reaction temperature inside the reactor vessel. For example, if the reaction temperature is about 300° C., the reaction fluid transferred from the reactor vessel to the pre-reactor vessel has a temperature of about 300° C.

Liquefaction fluid 224 transferred into the bottom of the pre-reactor vessel is combined with the slurry inside the pre-reactor vessel to form pressurized reaction slurry 218. The pressurized reaction slurry is then transferred to a reactor vessel. Reactor vessel 220 receives pressurized reaction slurry 218 at a pressure of about 600 psi. It should be recognized that the pressure at which the reaction slurry is transferred depends on the reaction pressure inside the reactor vessel. For example, if the reaction pressure is 680 psi, the reaction slurry may be transferred around about 680 psi.

Example 2

Production of Syngas in a Single-Vessel System

Figure 3:
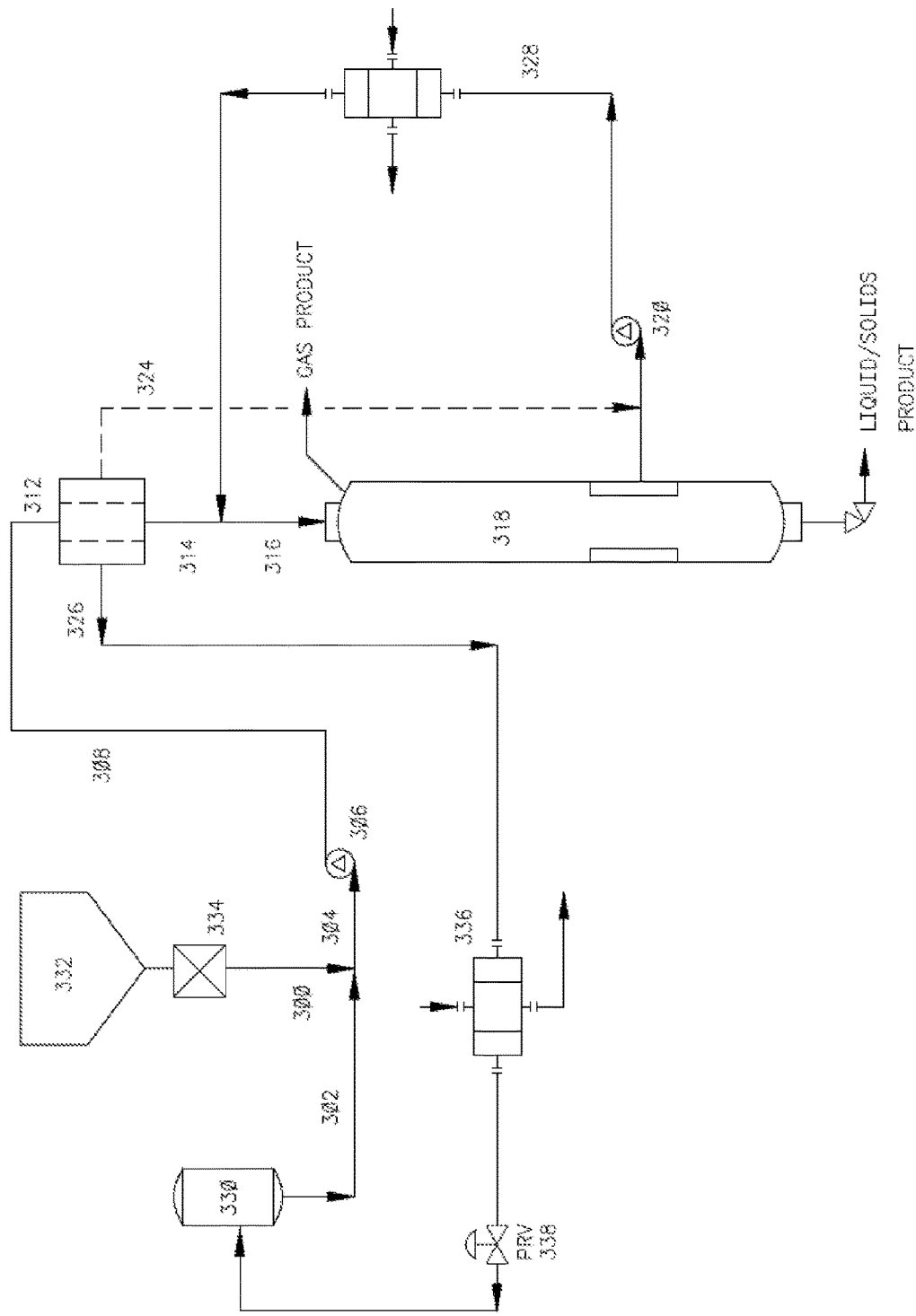
FIG. 3 depicts a single reactor system for transferring a pressurized slurry of practical-sized pieces of woody biomass into a high pressure, elevated temperature reactor vessel, in which supercritical water or other fluid liquefies or gasifies the biomass into a syngas or intermediate oil, and in which the dotted lines represent optional steps.

Biomass is converted by supercritical water gasification into a syngas of $H_2$, $CO$, $CO_2$, $CH_4$ and other minor constituents using a single-reactor system. The components of the single-reactor system for transferring a slurry of biomass into a high pressure, high temperature reactor vessel are depicted in FIG. 3. The single-reactor system depicted in FIG. 3 may also be used to produce bio-oil, or a hydrolysate consisting of monomers, dimers or oligomers of carbohydrates using a suitable dilute acid or base as the transport fluid. Furthermore, it should be understood that the system depicted in FIG. 3 is suitable for any of the conversion technologies discussed above.

In this Example, practical-sized pieces of plant-based biomass are combined with a transport fluid to form a pre-reaction slurry. With reference to FIG. 3, biomass 300 is fed into the system at about 100 metric tons/hr. At the same time, water 302 is also fed into the system at about 800 metric tons/hr. The biomass stream and water stream combine to form pre-reaction slurry 304. This pre-reaction slurry has about 8 parts fluid to 1 part biomass by weight. This 8-to-1 ratio allows the pre-reaction slurry to flow through progressing cavity pump 306 without clogging the pump. Other pumps known in the art may be used, such as peristaltic pump or a series of open impeller pumps to achieve a high pressure.

Biomass feedstock 300 consists of pieces having different sizes and irregular shapes. Some pieces of wood chips may be as large as ¼ inches wide in any given dimension, but most of the pieces are about 1 inch wide. About 20% or more of the wood chip pieces in chip bin 332 are at least 1/8 inch wide. Chip meter 334 regulates the flow of biomass 300 leaving the bin, as they combine with water 302 to form a slurry.

Water 302 is stored in surge tank 330 at around 90-100° C., and typically does not exceed a maximum temperature of about 100° C.

Pre-reaction slurry 304 is pressurized through progressing cavity pump 306 to about 3200 psi. Liquid 326 is removed from pressurized pre-reaction slurry 308 in separator 312, and recycled to surge tank 330. Before re-entry into surge tank 330, heat exchanger 336 reduces the temperature of liquid 326, followed by pressure reduction valve 338. Liquid 326 is returned to surge tank 330 at atmospheric pressure and has a maximum temperature of about 100° C.

Pressurized pre-reaction slurry 308 has a temperature of about 200° C. Pressurized pre-reaction slurry 308 is concentrated in separator 312 to form pressurized concentration slurry 314 with about 2 parts liquid to 1 part biomass. Before transfer into reactor vessel 318, pressurized concentrated slurry 314 is contacted with hot reaction fluid 328, which results in pressurized diluted slurry 316. Circulation pump 320 draws reaction fluid 340 out of reactor 318 and sends reaction fluid 340 through heat exchanger 322 to produce hot reaction fluid 328. Pressurized diluted slurry 316 has a temperature of 460° C., and has at least 3 parts liquid to 1 part biomass by weight before entering reactor 318. Pressurized diluted slurry 316 is then transferred to reactor vessel 318, where supercritical water gasification is taking place at 460° C. and 3200 psi.

The system in this Example can handle a wider range of liquid to biomass ratio compared to the system in Example 1. In some cases, the liquid-to-biomass ratio in the reactor may be above 5 part liquid to 1 part biomass by weight. As depicted in FIG. 3, piping 324 may be optionally added to the system to produce a slurry with a ratio greater than 8 parts liquid to 1 part biomass by weight.

The pressure of separator 312 and reactor 318 is 3200 psi. The high pressure for supercritical water gasification can be accommodated with the system as depicted in FIG. 3 since separator 312 has no moving parts (or seals), and the concentrated slurry moves via gravity and pressure difference.

The process and system depicted in FIG. 3 can also attain a lower fluid-to-solids ratio in reactor 318 compared to the process and system depicted in FIG. 2. The process and system in this Example may attain a ratio of 2.5 parts liquid to 1 part biomass by weight, which would provide a more concentrated (higher titer) of sugar in the hydrolysate, in the case of hydrolysis of the biomass.

What is claimed:

1. A method for transferring a slurry of plant-based biomass into a reactor vessel, the method comprising:
    providing plant-based biomass, wherein the biomass is made up of discrete pieces, wherein at least 20% of the discrete pieces have a greatest dimension of at least about 1/8 inch;
    combining a transport fluid with the biomass to form a pre-reaction slurry, wherein the pre-reaction slurry has a first weight ratio of fluid to biomass;
    pressurizing the pre-reaction slurry to a pressure above about 300 psi;
    removing at least a portion of the transport fluid from the pressurized pre-reaction slurry in a pre-reactor vessel to form a pressurized concentrated slurry with a second weight ratio of fluid to biomass, wherein the first weight ratio of fluid to biomass is greater than the second weight ratio of fluid to biomass;
    combining a reaction fluid from a reactor vessel with the pressurized concentrated slurry to form a pressurized reaction slurry; and
    transferring the pressurized reaction slurry from the pre-reactor vessel into the reactor vessel, wherein the pressurized reaction slurry is received at the reactor vessel at a pressure above about 300 psi.

2. The method of claim 1, further comprising producing a reaction product comprising a liquid bio-oil product in the reactor vessel, wherein the temperature in the reactor vessel is at least about 250° C. and the pressure in the reactor vessel is at least 300 psi.

3. The method of claim 1, wherein the biomass comprises cellulose, hemicellulose, lignin, or a combination thereof.

4. The method of claim 1, wherein during the combining of the transport fluid with the biomass to form a pre-reaction slurry, the transport fluid has a maximum temperature of about 100° C.

5. The method of claim 1, wherein the removed fluid has a temperature between about 100° C. to 200° C.

6. The method of claim 1, wherein the pressurized pre-reaction slurry has a temperature between about 100° C. to 200° C. in the pre-reactor vessel.

7. The method of claim 1, wherein the pressurized reaction slurry is received at the reactor vessel at a temperature between 250° C. to 800° C.

8. The method of claim 1, wherein the pre-reaction slurry is pressurized to a pressure between about 300 psi and about 700 psi.

9. The method of claim 1, wherein the pre-reaction slurry is pressurized using two or more open impeller pumps arranged in a series.

10. The method of claim 1, wherein the transport fluid comprises a light cycle oil, a bio-oil, or any combination thereof.

11. The method of claim 1, wherein the reaction fluid is selected from the group consisting of water, a dilute acid, a dilute base, an alcohol, and any combination thereof.

12. The method of claim 1, wherein the reaction fluid has a temperature of between about 250° C. to 800° C.

13. The method of claim 1, wherein at least 50% of the discrete pieces have a greatest dimension of at least about 1/8 inch.

14. The method of claim 1, wherein the first weight ratio is at least 7 parts fluid to 1 part biomass.

15. The method of claim 1, wherein the second weight ratio is less than 5 parts fluid to 1 part biomass.

16. A method for transferring a slurry of plant-based biomass into a reactor vessel, the method comprising:
    providing plant-based biomass, wherein the biomass is made up of discrete pieces, wherein at least 20% of the discrete pieces have a greatest dimension of at least about 1/8 inch;
    combining a transport fluid with the biomass to form a pre-reaction slurry, wherein the pre-reaction slurry has a first weight ratio of fluid to biomass;
    pressurizing the pre-reaction slurry to a pressure above about 300 psi;
    removing at least a portion of the transport fluid from the pressurized pre-reaction slurry to form a pressurized concentrated slurry with a second weight ratio of fluid to biomass, wherein the first weight ratio is greater than the second weight ratio;
    combining a reaction fluid with the pressurized concentrated slurry to form a pressurized reaction slurry; and transferring the pressurized reaction slurry into a reactor vessel, wherein the reaction slurry is received at the reactor vessel at a pressure above about 300 psi.

17. The method of claim 16, further comprising producing a reaction product comprising a liquid bio-oil or bio-gas product in the reactor vessel, wherein the temperature in the reactor vessel is at least about 250° C. and the pressure in the reactor vessel is at least 300 psi.

18. The method of claim 16, wherein the removing of at least a portion of the transport fluid from the pressurized pre-reaction slurry employs a separator.

19. The method of claim 16, wherein the biomass comprises cellulose, hemicellulose, lignin, or a combination thereof.

20. The method of claim 16, wherein the transport fluid has a maximum temperature of about 100° C.

21. The method of claim 16, wherein the removed fluid has a temperature between about 100° C. to 200° C.

22. The method of claim 16, wherein the reaction fluid has a temperature between 250° C. to 800° C.

23. The method of claim 16, wherein the pressurized pre-reaction slurry has a temperature between about 100° C. to 200° C.

24. The method of claim 16, wherein the pressurized reaction slurry is received at the reactor vessel at a temperature between 250° C. to 800° C.

25. The method of claim 16, wherein the pre-reaction slurry is pressurized to a pressure between about 300 psi and about 3200 psi.

26. The method of claim 16, wherein the pre-reaction slurry is pressurized using one or more pumps.

27. The method of claim 26, wherein the one or more pumps are open impeller pumps.

28. The method of claim 26, wherein the one or more pumps are two or more pumps arranged in a series.

29. The method of claim 16, wherein the transport fluid is selected from the group consisting of water, a dilute acid, a dilute base, an alcohol, or a combination thereof.

30. The method of claim 16, wherein at least 50% of the discrete pieces have a greatest dimension of at least about ⅛ inch.

31. The method of claim 16, wherein the first weight ratio is at least 7 parts fluid to 1 part biomass.

32. The method of claim 16, wherein the second weight ratio is less than 5 parts fluid to 1 part biomass.

33. The method of claim 32, wherein the second weight ratio is between about 1.5-5 parts fluid to 1 part biomass.

34. The method of claim 16, wherein removing at least a portion of the transport fluid from the pressurized pre-reaction slurry is performed in a pre-reactor vessel.

35. The method of claim 34, wherein the pressurized pre-reaction slurry is received at the pre-reactor vessel at a pressure above 300 psi.

* * * * *